United States Patent
Duong et al.

(10) Patent No.: US 12,398,673 B2
(45) Date of Patent: *Aug. 26, 2025

(54) AIR INTAKE PLENUM WITH STRUTS

(71) Applicant: Pratt & Whitney Canada Corp., Longueuil (CA)

(72) Inventors: Hien Duong, Mississauga (CA); Jason Nichols, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,138

(22) Filed: Apr. 22, 2024

(65) Prior Publication Data

US 2024/0271563 A1    Aug. 15, 2024

Related U.S. Application Data

(63) Continuation of application No. 17/723,012, filed on Apr. 18, 2022, now Pat. No. 11,965,459.

(51) Int. Cl.
*F02C 7/042* (2006.01)
*F02C 7/052* (2006.01)

(52) U.S. Cl.
CPC .............. *F02C 7/042* (2013.01); *F02C 7/052* (2013.01); *F05D 2260/607* (2013.01)

(58) Field of Classification Search
CPC .. F02C 7/04; F02C 7/042; F02C 7/052; F05D 2260/607; F01D 9/00; F01D 9/02; F01D 9/04; F01D 9/048

See application file for complete search history.

(56) References Cited

U.S. PATENT DOCUMENTS

| | | | |
|---|---|---|---|
| 4,389,158 A * | 6/1983 | Nakanishi | F04D 29/462 |
| | | | 415/151 |
| 10,253,779 B2 | 4/2019 | Yao | |
| 10,385,868 B2 | 8/2019 | King | |
| 10,704,418 B2 | 7/2020 | Ramakrishnan | |
| 2017/0241342 A1* | 8/2017 | Gekht | F02C 7/042 |
| 2018/0298919 A1 | 10/2018 | Ikeguchi | |

FOREIGN PATENT DOCUMENTS

| | | |
|---|---|---|
| DE | 102017200754 A1 | 7/2018 |
| JP | H0717994 B2 | 3/1995 |
| JP | H0893691 A | 4/1996 |

* cited by examiner

*Primary Examiner* — Steven M Sutherland
(74) *Attorney, Agent, or Firm* — Getz Balich LLC

(57) ABSTRACT

An air intake plenum for a gas turbine engine is provided that includes an axial centerline, first and second gas path surfaces, and a plurality of struts. The gas path surfaces are spaced apart from one another and define at least a portion of a plenum interior. The struts extend lengthwise between the gas path surfaces. Each strut has a cross-section geometry. The cross-section geometry has a center, and major and minor axes. The struts are circumferentially spaced apart from one another within the plenum. Each strut is oriented at a clocking angle theta. The clocking angle theta for each respective strut is disposed between the major axis of that strut and a line that intersects the cross-section geometry center of that strut and the axial centerline. At least one strut of the plurality of struts is oriented at a clocking angle theta that is greater than zero.

3 Claims, 7 Drawing Sheets

AIR INTAKE PLENUM WITH STRUTS

This application is a continuation of U.S. patent application Ser. No. 17/723,012 filed Apr. 18, 2022 which is hereby incorporated herein by reference in its entirety.

TECHNICAL FIELD

The present disclosure relates to aircraft intake air plenums in general, and to aircraft intake air plenums having struts in particular.

BACKGROUND INFORMATION

In some aircraft applications, a compressor section for a turboshaft gas turbine engine application may receive intake air from an air intake plenum that extends completely around (e.g., 360°) a radial compressor intake. Intake air from aircraft ducting enters an inlet opening in the air intake plenum and is distributed circumferentially around the plenum. The intake air within the plenum is turned into the radial intake of the compressor section. In some embodiments, airflow exiting the air intake plenum encounters a plurality of inlet guide vanes (IGVs) prior to entering a first compressor stage, which IGVs function to apply a desired orientation of the airflow entering the first compressor stage.

Most plenum designs include a plurality of struts that extend through the interior of the plenum between gas path walls that define the interior of the plenum. The struts are stationary and are circumferentially spaced apart to provide structural support to the plenum/intake. It is known to dispose the struts in a uniform spacing around the circumference of the plenum; e.g., a plenum having four (4) struts may have a strut positioned every ninety degrees (90°) around the entire three-hundred and sixty degree (360°) circumference, etc. The exact number of struts in a plenum/intake may differ in different plenum designs.

Each strut has a lengthwise axis that extends between gas path surfaces, and each has a cross-section shape (i.e., cross-section perpendicular to the lengthwise axis). Struts can have a variety of different cross-section geometries although most have an oval/elliptical geometry defined by a major axis extending between vertexes and a minor axis perpendicular to the major axis (major axis>minor axis). In some instances, a strut may have a cross-section geometry that is airfoil-like. In these embodiments, the chord of the airfoil may be equated to a "major axis".

Struts disposed within an intake plenum almost always create an impediment to airflow traveling within the plenum. Airflow encountering a strut typically must pass by that strut. Each strut therefore typically has a stagnation point where the local velocity of the airflow is zero and the airflow separates to pass around the strut. A consequence of the separated airflow is a "pressure loss" or "low momentum" region (e.g., low pressure, low velocity, etc.) disposed on the side of the strut opposite the side of airflow impingement. These loss regions are indicative of undesirable energy or momentum losses within the airflow that are detrimental to airflow within the plenum.

It is often incorrectly assumed that intake air enters the inlet opening of the engine plenum in a uniform manner; e.g., uniform in fluid flow parameters such as volumetric flow rate, velocity, pressure, etc. In most instances, however, intake air enters the inlet opening of the engine plenum in a non-uniform manner; e.g., the fluid flow parameters of the intake air varies across the plenum inlet as a function of position. In fact, it is often the case that ducting that supplies the plenum is shortened for reasons like improving the external appearance for aircraft or reducing the cross-sectional area. Such modifications often require very compact ducting upstream of the plenum and the compact ducting often produces non-uniform flow at the engine air intake plenum inlet with consequential impact on compressor performance.

What is needed is an improved air intake plenum strut arrangement that decreases airflow losses within the plenum, and one that accommodates non-uniform airflow into the plenum.

SUMMARY

According to an aspect of the present disclosure, an air intake plenum for a gas turbine engine is provided that includes an axial centerline, a first gas path surface, a second gas path surface, and a plurality of struts. The second gas path surface is spaced apart from the first gas path surface. The first and second gas path surfaces define at least a portion of a plenum interior configured for air passage. The plurality of struts extend lengthwise between the first and second gas path surfaces, through the plenum interior. Each strut has a cross-section geometry within a plane perpendicular to a lengthwise axis of the strut. The cross-section geometry having a center, a major axis and a minor axis, where the major axis is greater than the minor axis. The plurality of struts are disposed circumferentially spaced apart from one another within the plenum. Each of the plurality of struts is oriented at a clocking angle theta. The clocking angle theta for each respective strut is disposed between the major axis of that respective strut and a line that intersects the cross-section geometry center of that strut and the axial centerline. At least one strut of the plurality of struts is oriented at a clocking angle theta that is greater than zero.

In any of the aspects or embodiments described above and herein, the air intake plenum may be configured to provide air to a compressor section of a gas turbine engine.

In any of the aspects or embodiments described above and herein, the at least one strut of the plurality of struts may include a first strut oriented at a clocking angle theta1 that is greater than zero and a second strut oriented at a clocking angle theta2 that is greater than zero, wherein theta2 is greater than theta1.

In any of the aspects or embodiments described above and herein, the at least one strut of the plurality of struts is oriented at a clocking angle theta equal to zero.

In any of the aspects or embodiments described above and herein, each strut of the plurality of struts may be circumferentially positioned at a respective circumferential angle phi, and the clocking angle theta of a given strut within the plurality of struts may be a function of the circumferential angle phi of that particular strut.

In any of the aspects or embodiments described above and herein, the plurality of struts may be uniformly circumferentially spaced within the plenum.

In any of the aspects or embodiments described above and herein, the plurality of struts may be non-uniformly circumferentially spaced within the plenum.

In any of the aspects or embodiments described above and herein, the air intake plenum may include an air inlet, and the majority of the struts may be disposed within the plenum in a portion of the plenum disposed on an opposite side of the axial centerline than the air inlet.

In any of the aspects or embodiments described above and herein, the at least one strut of the plurality of struts may have a symmetrical cross-section geometry.

In any of the aspects or embodiments described above and herein, the cross-section geometry center of the at least one strut of the plurality of struts may be disposed at an intersection of the major axis and the minor axis.

In any of the aspects or embodiments described above and herein, the at least one strut of the plurality of struts may include at least one first strut having a first cross-section geometry and at least one second strut having a second cross-section geometry, wherein the first cross-section geometry is different from the second cross-section geometry.

In any of the aspects or embodiments described above and herein, the plurality of struts includes "N" number of struts, where "N" is an integer greater than two, and each respective strut may be circumferentially positioned at a respective circumferential angle phi, and the clocking angle theta of that strut is a function of at least one of the circumferential angle phi of that particular strut, the cross-section of that particular strut, and the N number of struts.

According to another aspect of the present disclosure, a gas turbine engine is provided that includes an axial centerline, at least one compressor rotor stage having a first bladed rotor rotatable about the axial centerline, at least one turbine rotor stage having a second bladed rotor rotatable about the axial centerline, and an air intake plenum in communication with the at least one compressor rotor stage. The air intake plenum includes a first gas path surface and a second gas path surface, spaced apart from the first gas path surface. The first and second gas path surfaces define at least a portion of a plenum interior configured for air passage. A plurality of struts extend lengthwise between the first and second gas path surfaces through the plenum interior. Each strut has a cross-section geometry within a plane perpendicular to a lengthwise axis of the strut. The cross-section geometry has a center, a major axis and a minor axis, where the major axis is greater than the minor axis. The plurality of struts are disposed circumferentially spaced apart from one another within the plenum. Each of the plurality of struts is oriented at a clocking angle theta, wherein the clocking angle theta for each respective strut is disposed between the major axis of that respective strut and a line that intersects the cross-section geometry center of that strut and the axial centerline. At least one strut of the plurality of struts is oriented at a clocking angle theta that is greater than zero.

According to an aspect of the present disclosure, a method of orienting a plurality of struts within an air intake plenum in a gas turbine engine is provided. The method includes: a) providing an air intake plenum that includes an axial centerline, a first gas path surface, a second gas path surface, and "N" number of struts, where N is an integer equal to or greater than two, and wherein the second gas path surface is spaced apart from the first gas path surface, wherein the first gas path surface and the second gas path surface define at least a portion of a plenum interior configured for air passage, and the N number of struts extend lengthwise between the first gas path surface and the second gas path surface through the plenum interior, and wherein each strut has a cross-section geometry within a plane perpendicular to a lengthwise axis of the respective strut, the cross-section geometry having a center, a major axis and a minor axis, where the major axis is greater than the minor axis, and wherein each respective strut of the N number of struts is circumferentially positioned at a respective circumferential angle phi, and wherein each of the N number of struts is oriented at a clocking angle theta, wherein the clocking angle theta for each respective strut is disposed between the major axis of that respective strut and a line that intersects the cross-section geometry center of that strut and the axial centerline; and b) determining a clocking angle for each strut of the N number of struts based on at least one of the circumferential angle phi of that particular strut, the cross-section of that particular strut, and the N number of struts, and wherein at least one strut of the N number of struts is oriented at a clocking angle theta that is greater than zero.

In any of the aspects or embodiments described above and herein, the step of determining a clocking angle may include determining the clocking angle theta for each strut as a function of the circumferential angle phi for that strut.

In any of the aspects or embodiments described above and herein, a polynomial equation may be used to determine the clocking angle theta for each strut as a function of the circumferential angle phi for that strut.

In any of the aspects or embodiments described above and herein, the polynomial equation $$\theta = V\phi^4 - W\phi^3 + X\phi^2 + Y\phi + Z$$

may be used to determine the clocking angle theta for each strut as a function of the circumferential angle phi for that strut.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
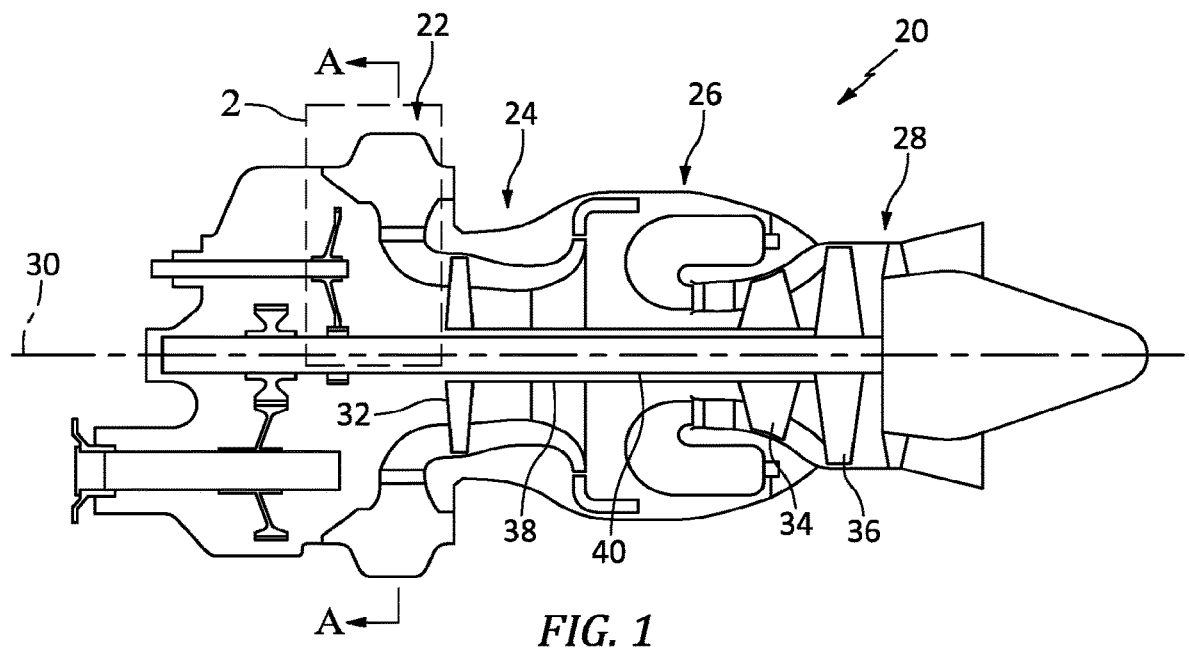
FIG. 1 is a perspective view of an example gas turbine engine.

FIG. 1 diagrammatically illustrates a cross-section of gas turbine engine 20 that includes an air intake plenum 22 in fluid communication with airflow from upstream ducting (not shown), a compressor section 24, a combustor section 26, and a turbine section 28 in serial flow communication along an engine axial centerline 30. The terms "forward" and "aft" are used herein to refer to relative axial positions; e.g., in gas turbine engine 20 example shown in FIG. 1, the compressor section 24 is disposed forward of the turbine section 28 and therefore the turbine section 28 is aft of the compressor section 24. The combustor section 24 is shown as having at least one rotor stage 32 having a rotor with a plurality of blades disposed around the circumference of the rotor. The turbine section 28 is shown as having a high pressure rotor stage 34 and a low pressure rotor stage 36, each stage 34, 36 having a rotor with a plurality of blades disposed around the circumference of the respective rotor. The turbine high pressure rotor stage 34 is in communication with a first spool 38 that is in communication with the compressor rotor stage 32. The turbine low pressure rotor stage 36 is in communication with a second spool 40 that is in co-axial with the first spool 38. The second spool 40 may be in communication directly or indirectly (e.g., through a gearbox) with a fan section, a propeller, or the like (not shown). In this example, intake air from aircraft ducting (not shown) enters the air intake plenum 22, and passes into the compressor section 24. The compressor section 24 does work on the intake air causing it to increase in pressure and temperature. Within the combustor section 26, fuel is added to the worked air and the mixture is ignited. Byproducts from the combustion and some amount of worked air (collectively now referred to as "core gas") subsequently passes into the turbine section 28 where the core gas powers the spools 38, 40. The core gas subsequently passes through a turbine exhaust case (which may also include struts) before exiting the gas turbine engine 20.

Figure 2:
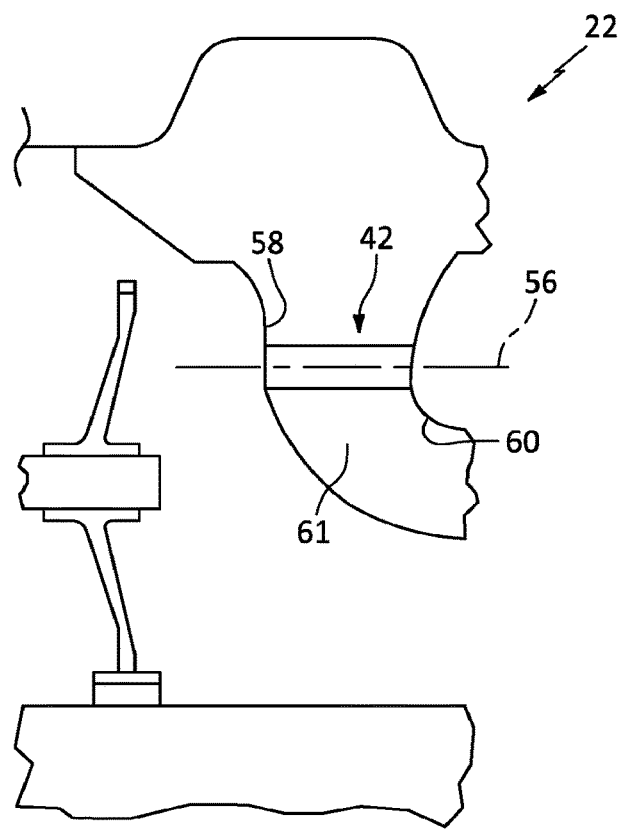
FIG. 2 is an enlarged portion of the gas turbine engine shown in FIG. 1, now including an air intake plenum strut.

The partial section shown in FIG. 2 illustrates an example of where a strut 42 may be located within a compressor air intake plenum 22 and the present disclosure is not limited thereto. Moreover, the present disclosure is not limited to any particular air intake plenum 22 configuration, other than one having a strut 42 configuration as described herein. The intake air plenum 22 may be described as being defined by a first gas path wall 58 and an opposing second gas path wall 60 with a plenum interior 61 disposed there between. Depending on the orientation of the plenum 22, the first gas path wall 58 may be disposed forward of the second gas path wall 60, or the first gas path wall 58 may be disposed radially outside of the second gas path wall 60, or any combination thereof. The strut 42 shown in FIG. 2 extends between gas path walls 58, 60 along a lengthwise axis 56.

Figure 3:
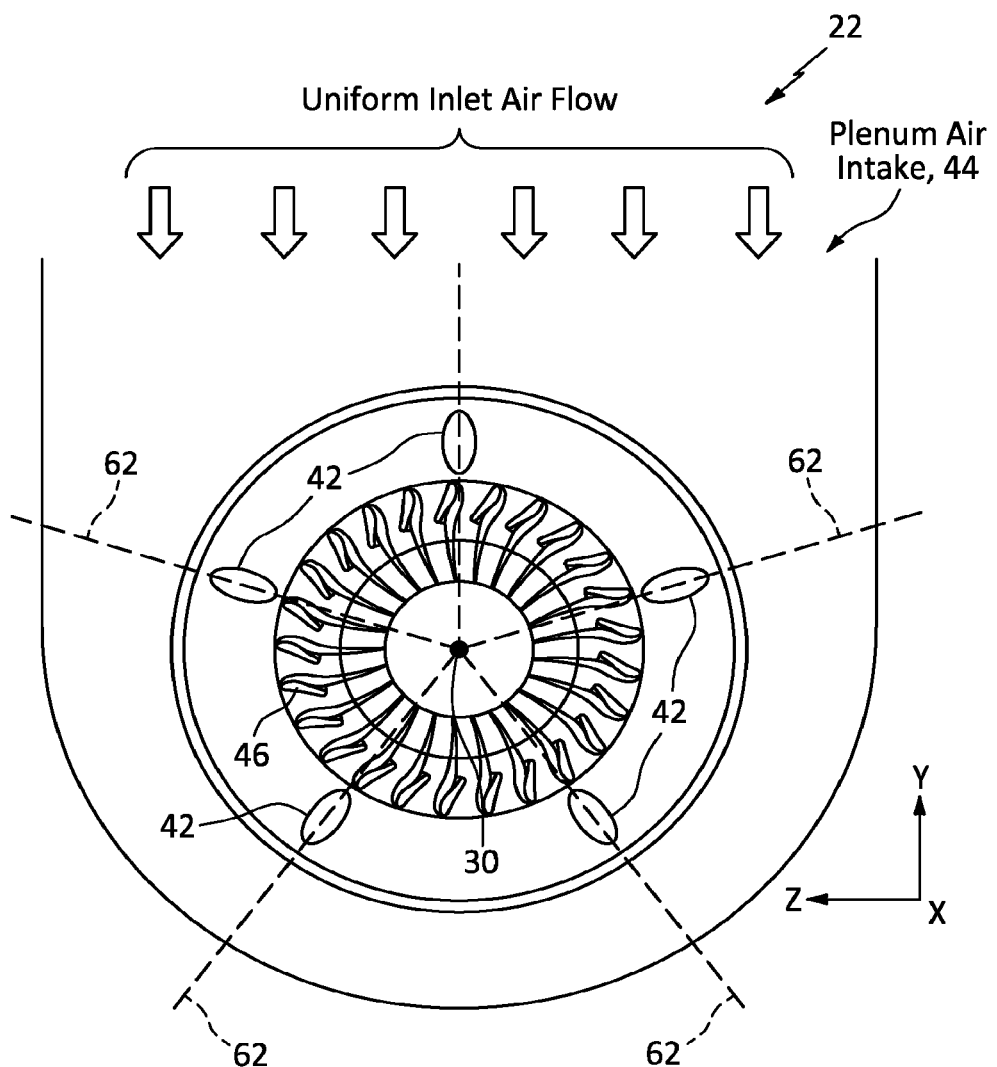
FIG. 3 is a diagrammatic sectional view (see Section A-A in FIG. 1) of an air intake plenum embodiment.
Figure 4:
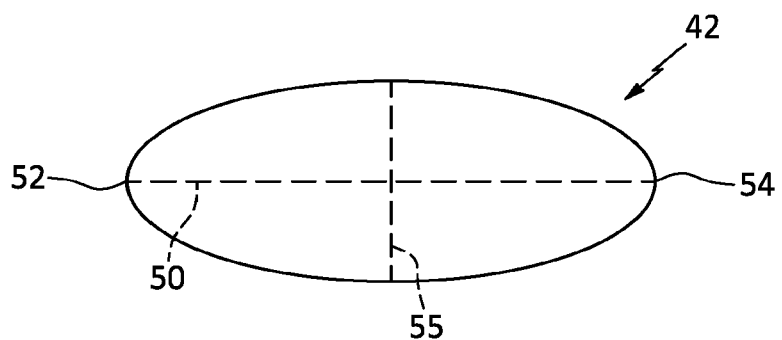
FIG. 4 is a diagrammatic view of a strut cross-section geometry.

FIG. 3 diagrammatically illustrates a sectioned air intake plenum 22 with an air inlet 44 and five (5) struts 42 uniformly spaced from one another around the circumference of the plenum 22; e.g., each strut 42 is positioned about seventy-two degrees (72°) or 2π radians/5 from adjacent struts 42 around the plenum 22 circumference. A plurality of inlet guide vanes (IGVs) 46 are disposed radially inside of the struts 42 and around a compressor inlet 48 (the IGVs 46 may not be axially aligned with the struts 42). The struts 42 all have the same configuration; e.g., an elliptical shape having a major axis 50 extending through a first vertex 52 and a second vertex 54 and a minor axis 55 (see FIG. 4). The major axis 50 is perpendicular to the minor axis 55. In the embodiment shown in FIG. 3, the major axis 50 of each strut 42 is collinear with a respective line that intersects the axial centerline 30 of the compressor section 24. In this diagram, the air flow entering the compressor air intake plenum 22 via the air inlet 44 is shown diagrammatically as being uniform across the inlet 44; e.g., the fluid flow parameters of the inlet air are uniform across the inlet 44.

Figure 5:
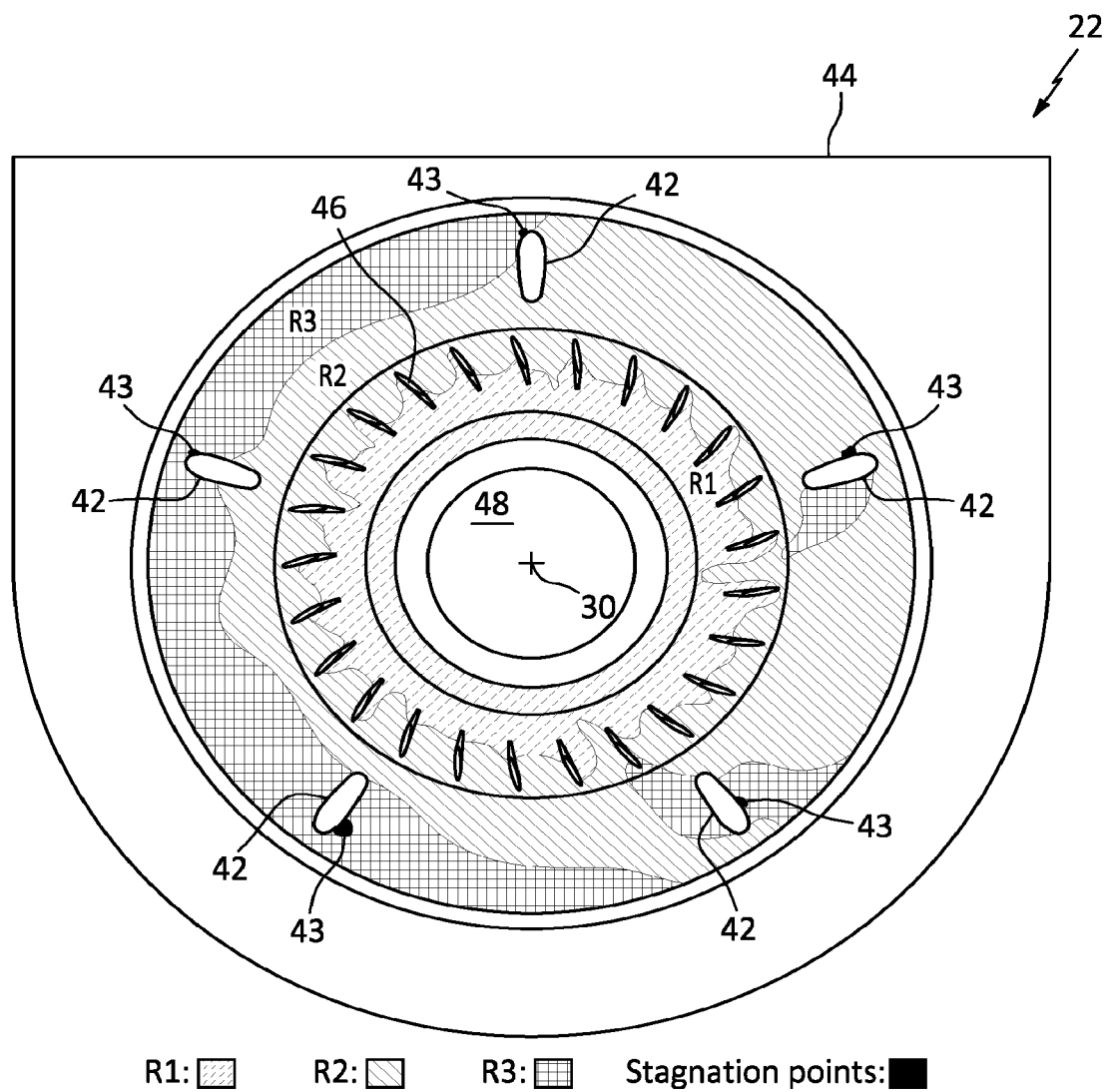
FIG. 5 is an exemplary fluid flow diagram for an air intake plenum like that shown in FIG. 3.
Figure 6:
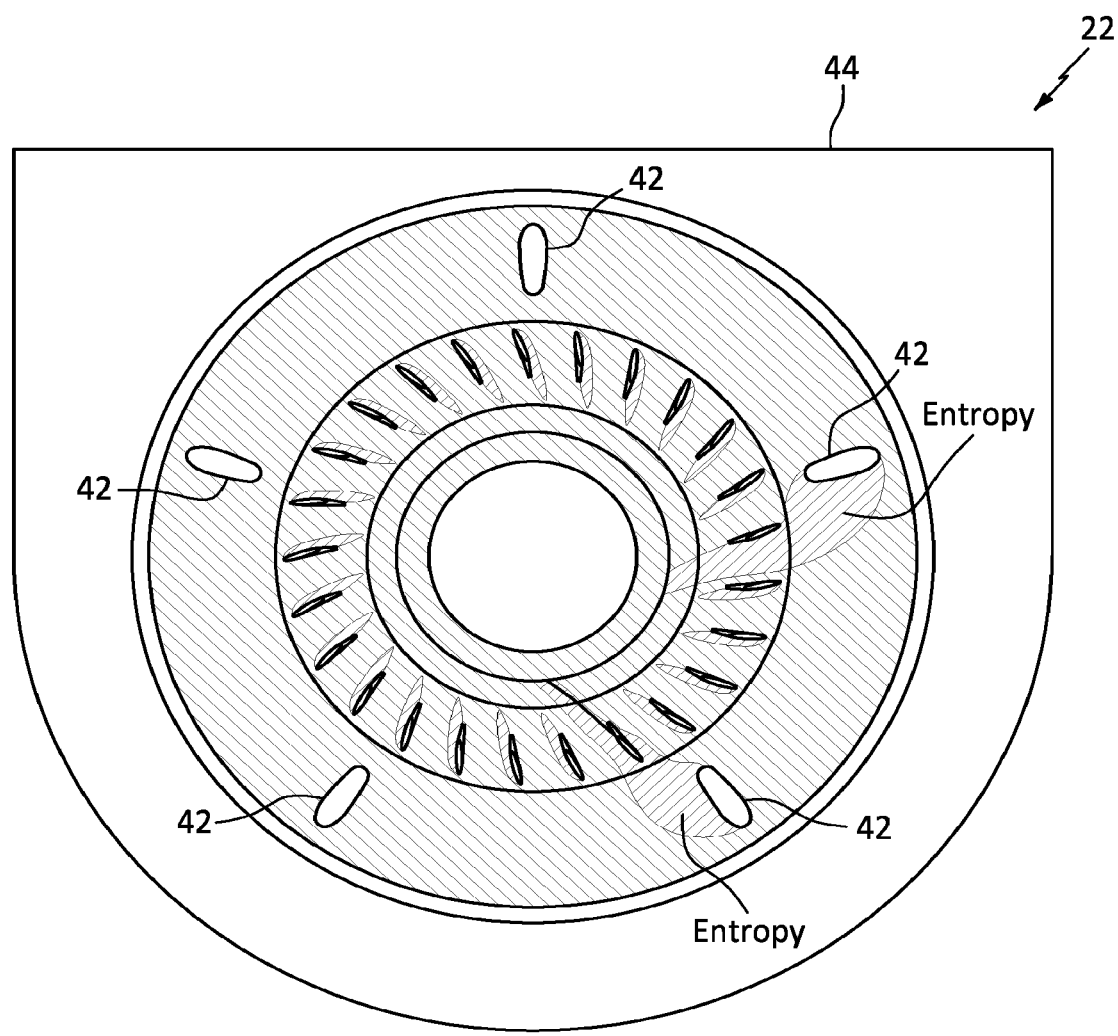
FIG. 6 is an exemplary entropy diagram for an air intake plenum like that shown in FIG. 3.

FIG. 5 is an exemplary fluid flow diagram for an air intake plenum 22 like that shown in FIG. 3. The relative airflow velocities are shown diagrammatically as a function of absolute Mach number. Intake air entering the plenum 22 travels circumferentially both clockwise and counterclockwise around the axial centerline 30. The relative differences in airflow velocity are indicated by different region numbers (R1, R2, R3) with each region depicted by different cross-hatching; i.e., airflow velocity indicated by region R1 is greater than the airflow velocity indicated by region R2, and the airflow velocity indicated by region R2 is greater than the airflow velocity indicated by region R3. It should be noted that the airflow velocity regions R1-R3 in FIG. 5 are simplified representations to facilitate illustration of the same. Nonetheless, the aforesaid airflow velocity regions accurately depict an example of circumferentially non-uniform airflow velocities within a plenum 22. The fluid flow stagnation point 43 for each strut 42 is shown; i.e., the point where the local airflow velocity is zero and the airflow separates to pass around the strut 42. FIG. 5 clearly shows a) the airflow velocity is circumferentially non-uniform around the plenum 22; and b) the presence of loss regions (e.g., flow regions having low pressure, low velocity—"low momentum") disposed relative to respective struts 42. FIG. 6 illustrates an exemplary entropy diagram for an air intake plenum 22 like that shown in FIG. 3. Here again, loss regions disposed relative to respective struts 42 are clearly visible. FIGS. 5 and 6 also diagrammatically show how airflow characteristics (e.g., strut wakes/loss regions) can extend into downstream IGVs 46. Strut wakes can cause high cycle fatigue and impact vibration on a downstream rotor and can lead to structural damage in rotors and/or IGVs.

Figure 7:
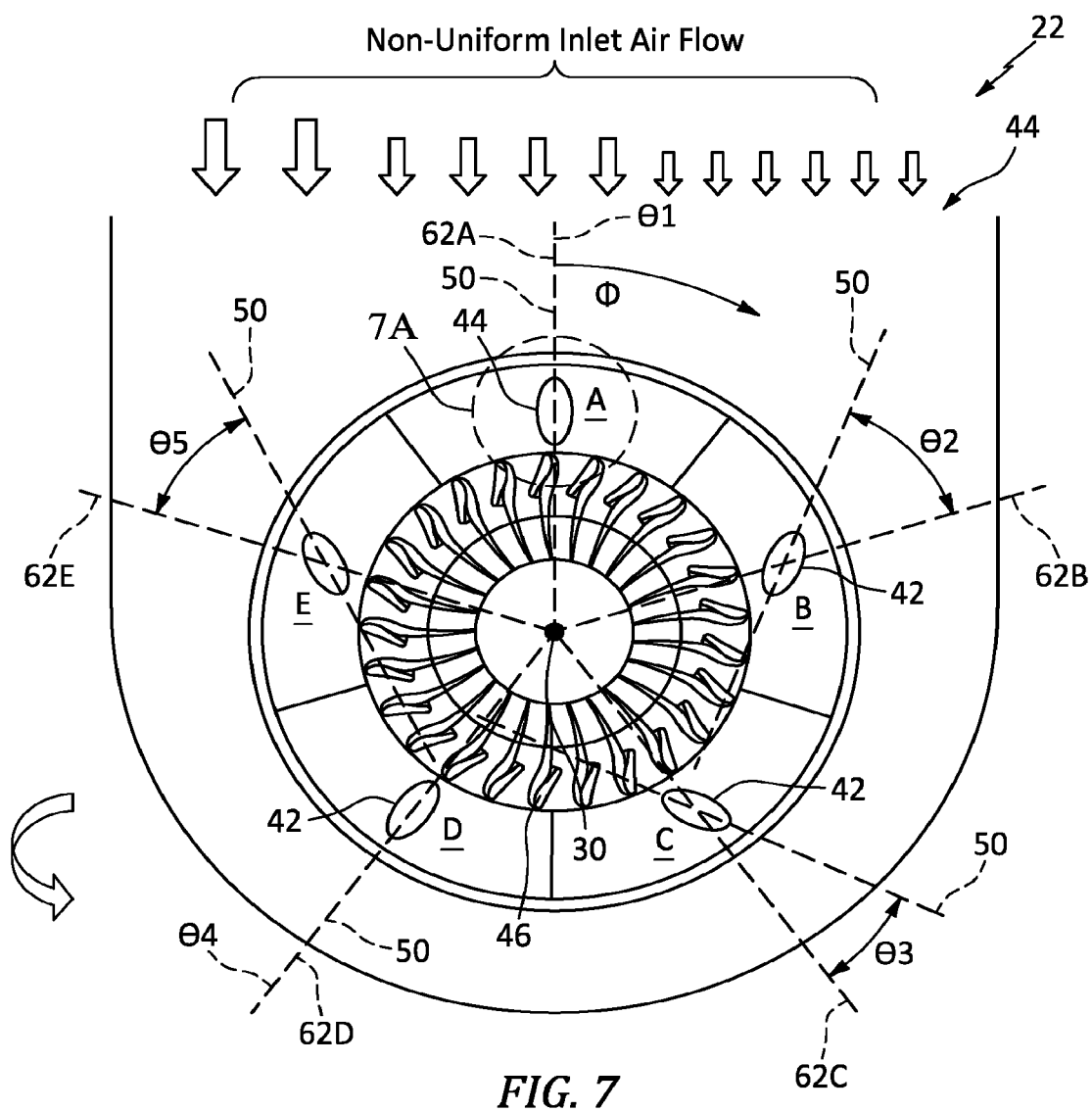
FIG. 7 is a diagrammatic sectional view of an air intake plenum embodiment, illustrating struts having respective major axes disposed at particular clocking angles.

Aspects of the present disclosure include an air intake plenum 22 with a plurality of struts 42 disposed around the circumference of the plenum 22. As stated above, each strut 42 may extend along a lengthwise axis 56 between a first gas path surface 58 and a second gas path surface 60 and the gas path surfaces 58, 60 define at least a portion of a plenum interior 61; e.g., see FIG. 2. The air intake plenum 22 includes an air inlet 44 that is connected to a source of air; e.g., a source of air directed to the plenum air inlet 4 via ducting. In FIG. 7, the air inlet 44 is shown as a single inlet disposed on an upper portion of the plenum 22. The present disclosure is not limited to any particular air inlet 44 positioning relative to the plenum 22, any particular air inlet 44 configuration, and is not limited to a single air inlet 44.

The air intake plenum 22 shown in FIG. 7 depicts five (5) struts 42 disposed circumferentially around a compressor inlet 48. A plurality of IGVs 46 are disposed radially between the struts 42 and compressor inlet 48 (the IGVs 46 may not be axially aligned with the struts 42). The present disclosure can be used with fewer or more than five (5) struts 42 and may be used in embodiments where IGVs 46 are used and in embodiments where IGVs 46 are not used.

Figure 7A:
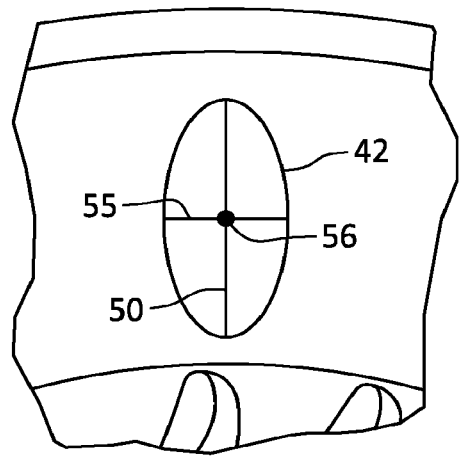
FIG. 7A is an enlarged view of the strut 42 also labeled as "strut A" in FIG. 7.

Each of the struts 42 shown in FIG. 7 has a cross-section geometry that reflects the strut 42 geometry in a plane perpendicular to the lengthwise axis 56 (see FIG. 2) of the strut 42. FIG. 7A is an enlarged view of the strut 42 also labeled as "strut A" in FIG. 7. Each strut cross-section geometry includes a major axis 50 and a minor axis 55, where the major axis 50 is greater than the minor axis 55, and the major and minor axes 50, 55 are perpendicular one another. Non-limited examples of strut cross-section geometry include symmetrical geometries such as an ellipse or a non-circular oval, or a symmetrical airfoil, or the like, or non-symmetrical geometries such as certain non-symmetrical airfoil geometries, or the like. In terms of airfoil geometries, for purposes of description herein the chord of the airfoil geometry may be equated to the major axis 50. The present disclosure is not limited to any particular strut 42 cross-section geometry other than one having a major axis 50 that is greater than the minor axis 55. The struts 42 within some embodiments of the present disclosure may all have the same cross-section geometry. The struts 42 within some embodiments of the present disclosure may include at least one strut 42 having a first cross-section geometry and at least one strut having a second cross-section geometry, wherein the first and second cross-section geometries are not the same; i.e., in some embodiments not all of the struts 42 within the plenum 22 may have the same cross-section geometry.

The circumferential position of the struts 42 within the air intake plenum 22 may be described in terms of radians to facilitate the description. The angular position of each strut 42 within the plenum circumference is indicated by a circumferential angle phi ("ϕ"). For example, since two pi (2π) radians=360 degrees, a strut 42 located at top dead center may be described as being positioned at an angle phi equal to zero ("ϕ"=0) and a strut 42 located at bottom dead center may be described as being positioned at an angle phi equal to pi ("ϕ"=π). FIG. 7 illustrates the five struts 42 uniformly positioned around the circumference of the plenum 22; e.g., each strut 42 is equidistant to either adjacent strut 42. To be clear, the present disclosure is not limited to any particular number of struts 42 and is not limited to struts 42 that are uniformly positioned around the circumference of the plenum 22.

Aspects of the present disclosure reflect the discovery that the orientation of the major axis 50 of each strut 42 as a function of the respective strut's circumferential position can yield significant improvements in airflow within the air intake plenum 22; e.g., a significant decrease in airflow losses associated with respective struts 42, etc. It is known to orient struts 42 within an air plenum 22 so that the major axis 50 of each strut 42 is collinear with a respective line that intersects the axial centerline 30 of the compressor section 24, which centerline 30 is typically the axial/rotational centerline 30 of the gas turbine engine 20; e.g., see FIG. 3. According to aspects of the present disclosure, the major axis 50 of a strut 42 may be skewed by an angle theta ("θ"—which may be referred to herein as a "clocking angle") from a line 62 that intersects both the cross-section geometry center 64 of the strut 42 and the axial centerline 30 of the compressor section 24. The degree to which the major axis 50 of a strut 42 is skewed by an angle theta ("θ") according to the present disclosure may be determined, as described herein, by factors including the number of struts 42 within the plenum 22, the geometry of the struts 42, the circumferential position of a strut 42 within the plenum 22, flow characteristics of the inlet air entering the plenum 22 (e.g., the degree of uniformity or non-uniformity, velocity, etc.), the geometry of the plenum 22, and the like. To be clear, and as will be described herein, different struts 42 may have their respective major axis 50 skewed at different angle thetas (e.g., a first strut having a major axis disposed at a first theta angle, a second strut having a major axis disposed at a second theta angle that is different from the first theta angle, etc.) and certain struts 42 may have their respective major axis 50 skewed at an angle theta that is the same as one or more other struts 42 (e.g., a third and fourth strut each having a major axis 50 disposed at a given theta angle).

For struts 42 having a symmetrical cross-section geometry (e.g., an ellipse, an oval, etc.), the "center 64" of the strut 42 may be the center of that cross-section geometry. For example, the center of an elliptical cross-section geometry is the intersection point between the major and minor axes of the ellipse. For struts 42 having a non-symmetrical cross-section geometry (e.g., some airfoils, etc.), the "center 64" of the strut 42 may be chosen and that center point 64 may be used for each such strut 42 having that non-symmetrical cross-section geometry.

Orienting one or more struts 42 within an air plenum 22 so that the major axis 50 of a particular strut 42 is skewed by an angle theta (as described above) permits each strut 42 to be oriented for improved alignment of that strut 42 with airflow local to that strut 42 within the plenum 22. The resulting strut 42 orientations produce less loss within the plenum 22, improved airflow characteristics into the compressor inlet 48, and consequent improved engine performance with likely no gain in weight and/or increase in manufacturing cost.

Referring to FIG. 7, to facilitate the description herein the struts 42 disposed within the air intake plenum 22 are labeled as A, B, C, D, E in relative clockwise position around the circumference of the plenum 22. In this non-limiting example, the struts 42 are uniformly spaced from one another around the circumference of the plenum 22. Strut "A" is located at top dead center (ϕ=0) and is oriented to have its major axis 50 at a clocking angle theta1 ("θ1") equal to zero (θ1=0), meaning that the major axis 50 of strut "A" is collinear with a line 62A that intersects the cross-section geometry center 64 of strut "A" and the axial centerline 30 of the compressor section. Strut "B" is located at a circumferential angle phi2 (ϕ2=X radians, wherein "X" is 2π radians/5 displaced from top dead center and is oriented to have its major axis 50 at a clocking angle theta2 ("θ2"), meaning that the major axis 50 of strut "B" is skewed from a line 62B that intersects the cross-section geometry center 64 of strut "B" and the axial centerline 30 of the compressor section 24 by a clocking angle equal to theta2 ("θ2"). Strut "C" is located at a circumferential angle phi3 (ϕ3=2π radians) displaced from top dead center and is oriented to have its major axis 50 at a clocking angle equal to theta3 ("θ3"), meaning that the major axis 50 of strut "C" is skewed from a line 62C that intersects the cross-section geometry center of strut "C" and the axial centerline 30 of the compressor section 24 by a clocking angle theta3 ("θ3"). Strut "D" is located at a circumferential angle phi4 (ϕ4=3π radians) displaced from top dead center and is oriented to have its major axis 50 collinear with a line 62D that intersects the cross-section geometry center 64 of strut "D" and the axial centerline 30 of the compressor section 24, meaning that the major axis 50 of strut "D" is disposed at a clocking angle theta4 equal to zero (θ4=0). Strut "E" is located at a circumferential angle phi5 (ϕ5=4π radians) displaced from top dead center and is oriented to have its major axis 50 at a clocking angle theta5 ("θ5"), meaning that the major axis 50 of strut "E" is skewed from a line 62E that intersects the cross-section geometry center 64 of strut "E" and the axial centerline 30 of the compressor section 24 by a clocking angle theta5 ("θ5"). It can be seen from the description of the example given above and FIG. 7 that the clocking angles (θ1, θ2, θ3, θ4, θ5) of the respective struts may vary from one another or some may equal one another; e.g., in the example above, θ1=θ4=0. The above described strut arrangement (e.g., circumferential angles ϕ-ϕ5 and respective clocking angles θ1-θ5) is provided herein to illustrate the present disclosure and the present disclosure is not limited thereto.

Figure 8:
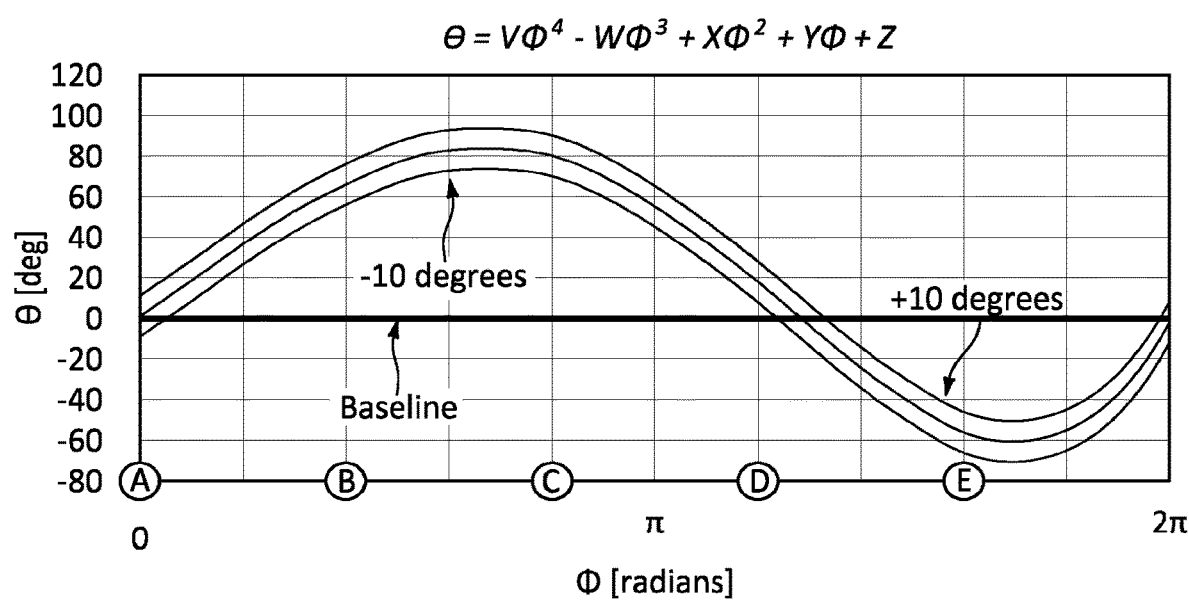
FIG. 8 is a graph of strut clocking angle theta ("θ") versus strut circumferential angle phi ("φ"), including a polynomial curve and offset curves.

The particular angle theta ("θ") for each strut 42 may be analytically determined, for example using fluid flow modeling software that may be tailored according to the present disclosure to consider factors such as the number of struts 42 within the plenum 22, the geometry of the struts 42, the circumferential position of a strut 42 within the plenum 22, flow characteristics of the inlet air entering the plenum 22 (e.g., the degree of uniformity or non-uniformity, velocity, etc.), the geometry of the plenum 22, and the like. In some embodiments, the skew angle theta ("θ") for each strut 42 may be characterized by a polynomial equation such as Equation 1 below:

$$\theta = V\phi^4 - W\phi^3 + X\phi^2 + Y\phi + Z \qquad \text{(Eqn. 1)}$$

where the coefficients V, W, X, Y, and Z may be analytically determined as stated above using fluid flow modeling software or other applicable method. FIG. 8 graphically illustrates the relationship between the clocking angle theta (φ) and the angular position phi ("φ") of a strut 42 within the plenum 22 circumference. Hence, a mathematical expression such as, but not limited to, Equation 1, that accounts for relevant variables can be used as a tool to determine an acceptable clocking angle theta (θ) for a given strut 42. The graphed function based on polynomial Equation 1 is further useful to consider plus and/or minus offsets in the clocking angle theta (θ); e.g., a ten degree offset (+/−10°) in the variable theta (θ). It should be noted that the example clocking angle orientations shown in FIG. 7, Equation 1, and the graph of FIG. 8 are based on a chosen engine axial rotation direction (i.e., counterclockwise—as indicated in FIG. 7). If the axial rotation of the compressor rotor stage 32 is opposite (i.e., clockwise) the convention for circumferential angle phi ("φ") would be reversed.

Figure 9:
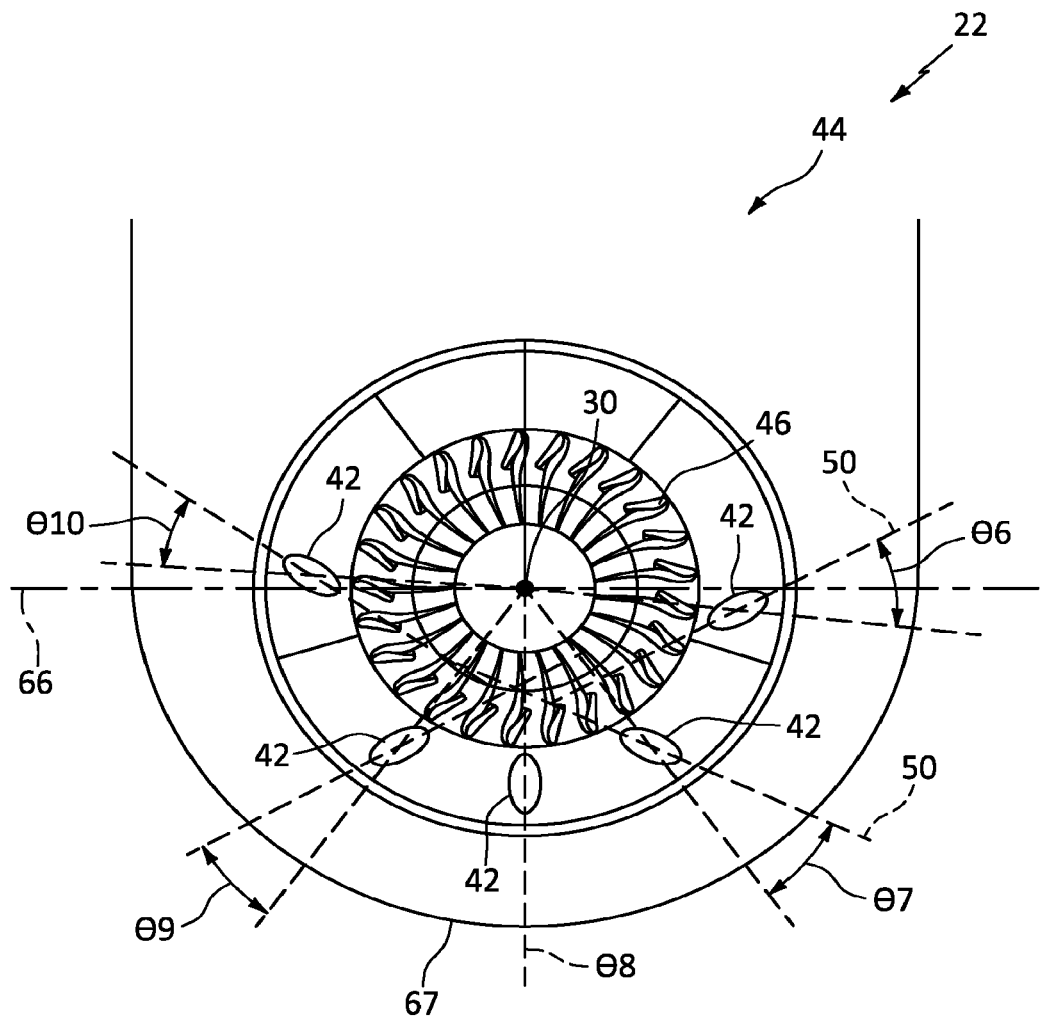
FIG. 9 is a diagrammatic sectional view of an air intake plenum embodiment, illustrating struts having respective major axes disposed at particular clocking angles, with the struts disposed in a non-uniform circumferential arrangement.

In the above examples, the struts 42 are shown and described as being uniformly spaced from one another around the circumference of the plenum 22. The present disclosure is not limited to an air intake plenum 22 with circumferentially uniformly spaced struts 42. According to some aspects of the present disclosure, an air intake plenum 22 may include a plurality of struts 42 within an intake plenum 22 that are non-uniformly spaced around the circumference of the intake plenum 22. The embodiment shown in FIG. 9 illustrates a strut 42 arrangement wherein the plurality of struts 42 are disposed closer to the end 67 of the plenum 22 opposite the air inlet 44 of the plenum 22; e.g., a majority of the struts 42 are disposed beneath a horizontal axis 66 line extending through the rotational axis 30 of the compressor section 24. In the particular embodiment shown in FIG. 9 four of five struts 42 are disposed below the aforesaid horizontal axis line 66. Since airflow velocity decreases from the plenum air inlet 44 to the opposite end 67 of the plenum 22, positioning struts 42 in a non-uniform arrangement as shown in FIG. 9 (e.g., spaced away from the air inlet 44) may, by itself, yield advantageous airflow characteristics within the plenum 22. In some embodiments (as shown in FIG. 9), a non-uniform strut 42 arrangement may be coupled with struts 42 disposed at clocking angle thetas (θ6, θ7, θ8, θ9, θ10) as described above to yield still further improvements in airflow characteristics within an air intake plenum 22. A desirable clocking angle theta for each strut 42 in such an arrangement may be determined as described above; e.g., using a mathematical expression like Equation 1.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An air intake plenum for a gas turbine engine, comprising:
   an axial centerline;
   a first gas path surface;
   a second gas path surface, spaced apart from the first gas path surface, wherein the first gas path surface and the second gas path surface define at least a portion of a plenum interior configured for air passage; and
   a plurality of struts that extend lengthwise between the first gas path surface and the second gas path surface through the plenum interior, each strut having a cross-section geometry within a plane perpendicular to a lengthwise axis of the strut, the cross-section geometry having a cross-section geometry center, a major axis, and a minor axis, where the major axis is greater than the minor axis, wherein the cross-section geometry is the same for each strut, and the cross-section geometry center disposed at an intersection of the major axis and the minor axis, and the cross-section is symmetrical about the cross-section geometry center;
   wherein the plurality of struts are disposed circumferentially spaced apart from one another within the air intake plenum, and the plurality of struts are disposed circumferentially around the axial centerline;
   wherein the plurality of struts includes a first strut, a second strut and a third strut, and the first strut is oriented at a first clocking angle, wherein the first clocking angle is disposed between the major axis of the first strut and a first radial line that extends from the axial centerline and intersects the cross-section geometry center of the first strut, and the second strut is oriented at a second clocking angle, wherein the second clocking angle is disposed between the major axis of the second strut and a second radial line that extends from the axial centerline and intersects the cross-section geometry center of the second strut, wherein the second clocking angle is not equal to the first clocking angle, wherein the third strut is oriented at a third clocking angle, wherein the third clocking angle is disposed between the major axis of the third strut and a third radial line that extends from the axial centerline and intersects the cross-section geometry center of the third strut, the third clocking angle is not equal to the first clocking angle or the second clocking angle;
   wherein the plurality of struts are non-uniformly circumferentially spaced within the air intake plenum;
   wherein the air intake plenum includes an air inlet; and
   wherein a majority of the struts within the plurality of struts are disposed within the air intake plenum in a portion of the air intake plenum disposed on an opposite side of the axial centerline than the air inlet.

2. A gas turbine engine, comprising:
   an axial centerline;
   at least one compressor rotor stage having a first bladed rotor rotatable about the axial centerline;
   at least one turbine rotor stage having a second bladed rotor rotatable about the axial centerline; and
   an air intake plenum in communication with the at least one compressor rotor stage, the air intake plenum including:
      a first gas path surface;
      a second gas path surface, spaced apart from the first gas path surface, wherein the first gas path surface and the second gas path surface define at least a portion of a plenum interior configured for air passage; and
      a plurality of struts that extend lengthwise between the first gas path surface and the second gas path surface through the plenum interior, each strut having a cross-section geometry within a plane perpendicular to a lengthwise axis of the strut, the cross-section geometry having a cross-section geometry center, a major axis, and a minor axis, where the major axis is greater than the minor axis, wherein the cross-section geometry is the same for each strut, and the cross-section geometry center disposed at an intersection of the major axis and the minor axis, and the cross-section is symmetrical about the cross-section geometry center;
      wherein the plurality of struts are disposed circumferentially spaced apart from one another within the air intake plenum, and the plurality of struts are disposed circumferentially around the axial centerline; and
      wherein the plurality of struts includes a first strut, a second strut and a third strut, and the first strut is oriented at a first clocking angle, wherein the first clocking angle is disposed between the major axis of the first strut and a first radial line that extends from the axial centerline and intersects the cross-section geometry center of the first strut, and the second strut is oriented at a second clocking angle, wherein the second clocking angle is disposed between the major axis of the second strut and a second radial line that extends from the axial centerline and intersects the cross-section geometry center of the second strut, wherein the second clocking angle is not equal to the first clocking angle, wherein the third strut is oriented at a third clocking angle, wherein the third clocking angle is disposed between the major axis of the third strut and a third radial line that extends from the axial centerline and intersects the cross-section geometry center of the third strut, the third clocking angle is not equal to the first clocking angle or the second clocking angle;
      wherein the plurality of struts are non-uniformly circumferentially spaced within the air intake plenum;
      wherein the air intake plenum includes an air inlet; and
      wherein a majority of the struts within the plurality of struts are disposed within the air intake plenum in a portion of the air intake plenum disposed on an opposite side of the axial centerline than the air inlet.

3. An air intake plenum for a gas turbine engine, comprising:
   an axial centerline;
   an air inlet;
   a first gas path surface;
   a second gas path surface, spaced apart from the first gas path surface, wherein the first gas path surface and the second gas path surface define at least a portion of a plenum interior configured for air passage; and
   a plurality of struts that extend lengthwise between the first gas path surface and the second gas path surface through the plenum interior, each strut having a cross-section geometry within a plane perpendicular to a lengthwise axis of the strut, the cross-section geometry having a cross-section geometry center, a major axis, and a minor axis, where the major axis is greater than the minor axis;
   wherein the plurality of struts are disposed non-uniformly circumferentially spaced apart from one another within the air intake plenum, and a majority of the struts within the plurality of struts are disposed within the air intake plenum in a portion of the air intake plenum disposed on an opposite side of the axial centerline than the air inlet; and wherein the plurality of struts includes a first strut and a second strut, and the first strut is oriented at a first clocking angle, wherein the first clocking angle is disposed between the major axis of the first strut and a first radial line that extends from the axial centerline and intersects the cross-section geometry center of the first strut, and the second strut is oriented at a second clocking angle, wherein the second clocking angle is disposed between the major axis of the second strut and a second radial line that extends from the axial centerline and intersects the cross-section geometry center of the second strut, wherein the second clocking angle is not equal to the first clocking angle.

* * * * *